(12) United States Patent
Kono et al.

(10) Patent No.: US 11,046,844 B2
(45) Date of Patent: Jun. 29, 2021

(54) MODIFIED POLYOLEFIN RESIN

(71) Applicant: NIPPON PAPER INDUSTRIES CO., LTD., Kita-ku (JP)

(72) Inventors: Masaru Kono, Tokyo (JP); Minoru Yada, Tokyo (JP); Naosuke Komoto, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 63 days.

(21) Appl. No.: 16/336,939

(22) PCT Filed: Sep. 26, 2017

(86) PCT No.: PCT/JP2017/034749
§ 371 (c)(1),
(2) Date: Mar. 27, 2019

(87) PCT Pub. No.: WO2018/062182
PCT Pub. Date: Apr. 5, 2018

(65) Prior Publication Data
US 2019/0264020 A1 Aug. 29, 2019

(30) Foreign Application Priority Data
Sep. 28, 2016 (JP) .............................. JP2016-189931

(51) Int. Cl.
| | |
|---|---|
| *C08L 33/14* | (2006.01) |
| *C09D 7/20* | (2018.01) |
| *C08L 23/28* | (2006.01) |
| *C08L 33/06* | (2006.01) |
| *C09D 11/033* | (2014.01) |
| *C09D 11/106* | (2014.01) |
| *C09D 11/107* | (2014.01) |
| *C09D 123/28* | (2006.01) |
| *C09D 133/06* | (2006.01) |
| *C09D 133/14* | (2006.01) |
| *C09J 11/06* | (2006.01) |
| *C09J 123/28* | (2006.01) |
| *C09J 133/06* | (2006.01) |
| *C09J 133/14* | (2006.01) |
| *C09J 127/24* | (2006.01) |
| *C08L 51/06* | (2006.01) |
| *C09D 151/06* | (2006.01) |
| *C09J 123/26* | (2006.01) |
| *C09J 151/06* | (2006.01) |
| *C08K 5/05* | (2006.01) |
| *C09D 127/24* | (2006.01) |
| *C08F 255/00* | (2006.01) |
| *C09D 123/26* | (2006.01) |

(52) U.S. Cl.
CPC ............ *C08L 33/14* (2013.01); *C08F 255/00* (2013.01); *C08K 5/05* (2013.01); *C08L 23/28* (2013.01); *C08L 33/066* (2013.01); *C08L 51/06* (2013.01); *C09D 7/20* (2018.01); *C09D 11/033* (2013.01); *C09D 11/106* (2013.01); *C09D 11/107* (2013.01); *C09D 123/26* (2013.01); *C09D 123/28* (2013.01); *C09D 127/24* (2013.01); *C09D 133/066* (2013.01); *C09D 133/14* (2013.01); *C09D 151/06* (2013.01); *C09J 11/06* (2013.01); *C09J 123/26* (2013.01); *C09J 123/28* (2013.01); *C09J 127/24* (2013.01); *C09J 133/066* (2013.01); *C09J 133/14* (2013.01); *C09J 151/06* (2013.01); *C08L 2201/56* (2013.01)

(58) Field of Classification Search
CPC .............................. C08L 33/14; C08L 33/066
See application file for complete search history.

(56) References Cited

U.S. PATENT DOCUMENTS

| | | | | |
|---|---|---|---|---|
| 5,135,984 | A | * 8/1992 | Kinosada | ............... C08F 299/00 |
| | | | | 525/192 |
| 5,580,933 | A | 12/1996 | Verge et al. | |
| 8,728,582 | B2 | * 5/2014 | Echizen | ................... C09D 5/36 |
| | | | | 427/385.5 |

(Continued)

FOREIGN PATENT DOCUMENTS

| | | |
|---|---|---|
| CN | 105263970 | 1/1916 |
| CN | 101018677 | 8/2007 |
| EP | 3 395 840 A1 | 10/2018 |

(Continued)

OTHER PUBLICATIONS

International Search Report dated Dec. 12, 2017 in PCT/JP2017/034749 filed on Sep. 26, 2017.

(Continued)

*Primary Examiner* — Elizabeth E Mulvaney
(74) *Attorney, Agent, or Firm* — Oblon, McClelland, Maier & Neustadt, L.L.P.

(57) ABSTRACT

Provided is a modified polyolefin resin that is excellent in adhesion to nonpolar substrates such as a polyolefin substrate, and excellent in stability in an alcohol solvent. In the modified polyolefin resin, the following polymer (A) is grafted on the following resin (B).

Polymer (A): a polymer including at least one constitutional unit selected from the group consisting of a constitutional unit derived from an α,β-unsaturated carboxylic acid and a constitutional unit derived from a derivative of an α,β-unsaturated carboxylic acid, and having a hydroxyl value in a range of 10 mgKOH/g or larger and 200 mgKOH/g or smaller.

Resin (B): a polyolefin resin or a modified product thereof.

15 Claims, No Drawings

(56) References Cited

U.S. PATENT DOCUMENTS

| | | |
|---|---|---|
| 9,458,267 B2 | 10/2016 | Ono et al. |
| 2017/0275457 A1 | 9/2017 | Yada et al. |

FOREIGN PATENT DOCUMENTS

| | | |
|---|---|---|
| JP | 61-31473 A | 2/1986 |
| JP | 4-296376 A | 10/1992 |
| JP | 6-192352 A | 7/1994 |
| JP | 7-10940 A | 1/1995 |
| JP | 10-140073 A | 5/1998 |
| JP | 11-323236 A | 11/1999 |
| JP | 2000-239602 A | 9/2000 |
| JP | 2002-317137 A | 10/2002 |
| JP | 2005-23153 A | 1/2005 |
| JP | 2007-91997 A | 4/2007 |
| WO | WO 2006/035708 A1 | 4/2006 |
| WO | WO 2014/148576 A1 | 9/2014 |
| WO | WO 2016/031883 A1 | 3/2016 |

OTHER PUBLICATIONS

Extended European Search Report dated Mar. 20, 2020, in Patent Application No. 17856132.0, 6 pages.
Office Action in corresponding Chinese Application No. 201780059668.5 dated Mar. 29, 2021. (w/English Translation).

\* cited by examiner

MODIFIED POLYOLEFIN RESIN

FIELD

The present invention relates to a modified polyolefin resin.

BACKGROUND

Polyolefin substrates such as polypropylenes have superior properties and are inexpensive, and therefore have been widely used for various films such as food packaging materials. For use in a film, printing or coating is applied to a surface of a polyolefin substrate to protect the surface and enhance the beauty.

However, polyolefin substrates are nonpolar, and the surface free energy of polyolefin substrates is low, and furthermore, polyolefin substrates are crystalline, and accordingly, there is a problem in that inks and paints are less likely to adhere to the substrates. Therefore, there has been widely used a method of enhancing adhesion of inks or paints to polyolefin substrates by adding a chlorinated polyolefin resin to inks or paints at the time of printing or coating.

In recent years, as interest in environmental protection and safety have been increasing and legislation has been reinforced, solvents used for inks and paints have been changed from aromatic solvents, such as toluene, which have been conventionally used, to ketone solvents, ester solvents, and alcohol solvents. Furthermore, in recent years, there are moves afoot to avoid the use of ketone solvents, and in contrast, the use of ester solvents or alcohol solvents as solvents used for inks and paints is being a current mainstream. In particular, from the viewpoint of high safety and inexpensiveness, the use of alcohol solvents, such as methanol, ethanol, isopropanol, and n-propanol, has been desired in newly emerging countries.

On the other hand, various methods for enhancing the solubility of chlorinated polyolefin resin in these solvents have been tried.

Patent Literature 1 describes that a graft copolymer obtained by grafting an unsaturated carboxylic acid monomer on an oxidized chlorinated polyolefin resin is used as a component of a resin composition for printing inks not including an aromatic solvent such as toluene. Patent Literature 2 describes that a resin obtained by oxidizing a chlorinated polyolefin resin and then reacting it with a polyester polyol and an organic diisocyanate and furthermore reacting the resultant with an organic diamine is uniformly dissolved in ethyl acetate.

CITATION LIST

Patent Literature

Patent Literature 1: Japanese Patent Application Laid-open No. 2002-317137
Patent Literature 2: Japanese Patent Application Laid-open No. H11-323236

SUMMARY

Technical Problem

Chlorinated polyolefin resins are difficult to be dissolved in solvents with high polarity, such as ester solvents and alcohol solvents.

The adhesion of the resins described in Patent Literatures 1 and 2 to polyolefin substrates is secured by using an ester solvent together with a cycloaliphatic hydrocarbon solvent with low polarity, such as cyclohexane or methylcyclohexane, but the resins still have lower affinity for alcohol solvents with higher polarity, and hence need to be improved.

An object of the present invention is to provide a modified polyolefin resin that is excellent in adhesion not only to polar substrates but also to nonpolar substrates such as a polyolefin substrate, and excellent in stability in alcohol solvents.

Solution to Problem

As a result of intensive studies, the inventors of the present invention have found that a modified polyolefin resin in which a polymer having a hydroxyl value in a predetermined range is grafted on a resin can solve the above-described problems. Specifically, the present invention provides the followings.

[1] A modified polyolefin resin in which the following polymer (A) is grafted on the following resin (B), Polymer (A): a polymer at least one constitutional unit selected from the group consisting of a constitutional unit derived from an $\alpha,\beta$-unsaturated carboxylic acid and a constitutional unit derived from a derivative of an $\alpha,\beta$-unsaturated carboxylic acid, and having a hydroxyl value in a range of 10 mgKOH/g or larger and 200 mgKOH/g or smaller, Resin (B): a polyolefin resin or a modified product thereof.

[2] The modified polyolefin resin according to [1], wherein the modified polyolefin resin is a chlorinated resin.
[3] The modified polyolefin resin according to [2], wherein the resin (B) is a chlorinated polyolefin resin.
[4] The modified polyolefin resin according to any one of [1] to [3], wherein the polymer (A) has a glass transition temperature (Tg) in a range of −10° C. or higher and 60° C. or lower.
[5] The modified polyolefin resin according to any one of [1] to [4], wherein the polymer (A) a constitutional unit derived from an $\alpha,\beta$-unsaturated carboxylic acid ester.
[6] The modified polyolefin resin according to any one of [1] to [5], wherein a content of the polymer (A) is in a range of 30% by weight or higher and 90% by weight or lower.
[7] The modified polyolefin resin according to any one of [1] to [6], wherein the modified polyolefin resin has a weight-average molecular weight in a range of 10,000 or higher and 200,000 or lower.
[8] A resin dispersion, comprising: a dispersing medium comprising 50% by weight or higher of alcohols; and the modified polyolefin resin according to any one of [1] to [7].
[9] A composition for adhesives, comprising the modified polyolefin resin according to any one of [1] to [7] or the resin dispersion according to [8].
[10] A composition for paints, comprising the modified polyolefin resin according to any one of [1] to [7] or the resin dispersion according to claim [8].
[11] An ink composition for gravure printing, comprising the modified polyolefin resin according to any one of [1] to [7] or the resin dispersion according to [8].
[12] An ink composition for flexographic printing, comprising the modified polyolefin resin according to any one of [1] to [7] or the resin dispersion according to [8].
[13] A gravure printed matter obtained by using the ink composition for gravure printing according to [11].

[14] A flexographic printed matter obtained by using the ink composition for flexographic printing according to [12].
[15] A method for gravure printing, comprising using the ink composition for gravure printing according to [11].
[16] A method for flexographic printing, comprising using the ink composition for flexographic printing according to [12].

Advantageous Effects of Invention

The present invention can provide a modified polyolefin resin that is excellent in adhesion to nonpolar substrates such as polyolefin substrates, and excellent in stability in alcohol solvents.

DESCRIPTION OF EMBODIMENTS

1. Modified Polyolefin Resin of the Present Invention

A modified polyolefin resin of the present invention is a modified resin in which the following polymer (A) is grafted on the following resin (B). Note that the modified polyolefin resin of the present invention is sometimes referred to as a modified polyolefin resin (C) or simply a resin (C).

1-1. Polymer (A)

The polymer (A) includes at least one constitutional unit selected from the group consisting of constitutional units derived from α,β-unsaturated carboxylic acids and constitutional units derived from derivatives of α,β-unsaturated carboxylic acids, and has a hydroxyl value in a range of 10 mgKOH/g or larger and 200 mgKOH/g or smaller.

The hydroxyl value of the polymer (A) is in a range of 10 mgKOH/g or larger and 200 mgKOH/g or smaller. When the hydroxyl value is smaller than 10 mgKOH/g, an obtained modified polyolefin resin has a lower polarity, and accordingly has lower dispersibility in alcohols and lower adhesion to, for example, polyolefin substrates. When the hydroxyl value is larger than 200 mgKOH/g, an obtained modified polyolefin resin has an excessively higher polarity, lower compatibility with other resins, and lower adhesion to, for example, polyolefin substrates, and furthermore, has a higher viscosity, which causes lower usability.

When the polymer (A) is composed of n types of monomer units $U_1$ to $U_n$ (n is an integer of 1 or larger), and the hydroxyl values of homopolymers of the monomer units $U_1$ to $U_n$ are $X_1$ to $X_n$ (mgKOH/g), respectively, and the weight proportions of the monomer units $U_1$ to $U_n$ in the polymer (A) are $Y_1$ to $Y_n$, respectively (note that the total of the weight proportions of the monomer units $U_1$ to $U_n$ is 1), the hydroxyl value $X_A$ (mgKOH/g) of the polymer (A) is calculated from the following equation.

$$X_A = X_1 Y_1 + X_2 Y_2 + \ldots X_n Y_n$$

The hydroxyl value of the polymer (A) in each of examples is also calculated using the above-mentioned manner.

The hydroxyl value of a homopolymer of a monomer unit is equal to the hydroxyl value of the monomer unit. A hydroxyl value is calculated by converting the amount (mol) of hydroxy groups contained in 1 g of a monomer unit into the weight of potassium hydroxide. For example, in the case of 2-hydroxyethyl acrylate, the hydroxyl value of a monomer unit can be calculated using the following formula.

1(the weight of 2-hydroxyethyl acrylate:g)/116(the molecular weight of 2-hydroxyethyl acrylate:g/mol)×(56.11×10³)(the weight of KOH per mol: mg/mol)=484(mgKOH/g)

The weight proportions of the monomer units $U_1$ to $U_n$ in the polymer (A) is usually in agreement with the weight proportions of the monomer units $U_1$ to $U_n$ charged. Note that the total of the weight proportions of the monomer units $U_1$ to $U_n$ charged is 1.

The polymer (A) includes at least one constitutional unit selected from the group consisting of constitutional units derived from α,β-unsaturated carboxylic acids and constitutional units derived from derivatives of α,β-unsaturated carboxylic acids.

Examples of the α,β-unsaturated carboxylic acids include, but are not limited to, α,β-unsaturated carboxylic acids having no hydroxy group (such as, (meth)acrylic acid) and α,β-unsaturated carboxylic acids having a hydroxy group. (Meth)acrylic acid is preferred.

The derivatives of the α,β-unsaturated carboxylic acids are not limited to particular ones, and may be derivatives of α,β-unsaturated carboxylic acids having no hydroxy group or may be derivatives of α,β-unsaturated carboxylic acids having a hydroxy group. Examples of the derivatives of the α,β-unsaturated carboxylic acids include α,β-unsaturated carboxylic acid esters optionally having a hydroxy group, α,β-unsaturated nitriles optionally having a hydroxy group, (such as (meth)acrylonitrile), and α,β-unsaturated amides optionally having a hydroxy group, (such as (meth)acrylamide), and specific examples thereof include esters, nitriles, and amides, each being derived from the above-mentioned α,β-unsaturated carboxylic acids.

Examples of the derivatives of the α,β-unsaturated carboxylic acids having no hydroxy group include α,β-unsaturated carboxylic acid esters having no hydroxy group, and further specific examples thereof include (meth)acrylic acid esters, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, dodecyl (meth)acrylate, 2-ethylhexyl (meth)acrylate, stearyl (meth)acrylate, isobornyl (meth)acrylate, tetrahydrofurfuryl (meth)acrylate, cyclohexyl (meth)acrylate, benzyl (meth)acrylate, phenoxyethyl (meth)acrylate, 2-ethoxyethyl (meth)acrylate, 2-methoxyethyl (meth)acrylate, and adamantyl (meth)acrylate.

Examples of the derivatives of the α,β-unsaturated carboxylic acids having a hydroxy group include α,β-unsaturated carboxylic acid esters having a hydroxy group, and further specific examples thereof include hydroxyalkyl (meth)acrylate, such as 2-hydroxyethyl (meth)acrylate, 1-hydroxypropyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 2-hydroxyhexyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate;

hydroxycycloalkyl (meth)acrylate, such as (4-hydroxymethylcyclohexyl)methyl (meth)acrylate, and 1,4-cyclohexanedimethanol mono(meth)acrylate;

2-hydroxy-3-phenoxypropyl (meth)acrylate;

2-(meth)acryloyloxyethyl-2-hydroxypropylphthalate glycerol mono(meth)acrylate;

polyethylene glycol mono(meth)acrylate;

polypropylene glycol mono(meth)acrylate; and polytetramethylene glycol mono(meth)acrylate.

In the present specification, "(meth)acrylic acid" means "methacrylic acid or acrylic acid", "(meth)acrylate" means "methacrylate or acrylate", "(meth)acrylamide" means "methacrylamide or acrylamide", and "(meth)acrylonitrile"

means "methacrylonitrile or acrylonitrile". The hydroxy group in the polymer (A) does not include an hydroxy group in a carboxy group.

The polymer (A) preferably includes at least one selected from the group (hereinafter, also referred to as the group (OH)) consisting of constitutional units derived from α,β-unsaturated carboxylic acids having a hydroxy group and constitutional units derived from derivatives of α,β-unsaturated carboxylic acids having a hydroxy group. The polymer (A) more preferably further includes at least one selected from the group (hereinafter, also referred to as the group (H)) consisting of constitutional units derived from α,β-unsaturated carboxylic acids having no hydroxy group and constitutional units derived from derivatives of α,β-unsaturated carboxylic acids having no hydroxy group. Hereinafter, a constitutional unit derived from a certain monomer "A" is also simply referred to as an "A" unit.

The at least one selected from the group (OH) is preferably an α,β-unsaturated carboxylic acid ester unit having a hydroxy group, more preferably a hydroxyalkyl (meth)acrylate unit, and still more preferably at least one selected from a 2-hydroxyethyl (meth)acrylate unit and a 4-hydroxybutyl (meth)acrylate unit.

The α,β-unsaturated carboxylic acids having no hydroxy group are preferably (meth)acrylic acids.

The derivatives of the α,β-unsaturated carboxylic acids having no hydroxy group are preferably α,β-unsaturated carboxylic acid esters having no hydroxy group, more preferably at least one selected from methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, dodecyl (meth)acrylate, 2-ethylhexyl (meth)acrylate, stearyl (meth)acrylate, isobornyl (meth)acrylate, tetrahydrofurfuryl (meth)acrylate, cyclohexyl (meth)acrylate, benzyl (meth)acrylate, phenoxyethyl (meth)acrylate, 2-ethoxyethyl (meth)acrylate, 2-methoxyethyl (meth)acrylate, adamantyl (meth)acrylate, and (meth)acrylamide, and still more preferably at least one selected from methyl (meth)acrylate, ethyl (meth)acrylate, n-butyl (meth)acrylate, tert-butyl (meth)acrylate, stearyl (meth)acrylate, isobornyl (meth)acrylate, cyclohexyl (meth)acrylate, adamantyl (meth)acrylate, and 2-methoxyethyl (meth)acrylate.

The at least one selected from the group (H) is
preferably at least one selected from a (meth)acrylic acid unit, a methyl (meth)acrylate unit, an ethyl (meth)acrylate unit, an n-propyl (meth)acrylate unit, an isopropyl (meth)acrylate unit, an n-butyl (meth)acrylate unit, an isobutyl (meth)acrylate unit, a tert-butyl (meth)acrylate unit, a dodecyl (meth)acrylate unit, a 2-ethylhexyl (meth)acrylate unit, a stearyl (meth)acrylate unit, an isobornyl (meth)acrylate unit, a tetrahydrofurfuryl (meth)acrylate unit, a cyclohexyl (meth)acrylate unit, a benzyl (meth)acrylate unit, a phenoxyethyl (meth)acrylate unit, a 2-ethoxyethyl (meth)acrylate unit, a 2-methoxyethyl (meth)acrylate unit, an adamantyl (meth)acrylate unit, and a (meth)acrylamide unit, and
more preferably at least one selected from a (meth)acrylic acid unit, a methyl (meth)acrylate unit, an ethyl (meth)acrylate unit, an n-butyl (meth)acrylate unit, a tert-butyl (meth)acrylate unit, a stearyl (meth)acrylate unit, an isobornyl (meth)acrylate unit, a cyclohexyl (meth)acrylate unit, an adamantyl (meth)acrylate unit, and a 2-methoxyethyl (meth)acrylate unit.

The polymer (A) may include a single one of or a combination of two or more of the constitutional units included in the group (OH).

The polymer (A) may include a single one of or a combination of two or more of the constitutional units included in the group (H).

The content of the constitutional units included in the group (OH) in the polymer (A) is preferably 3% by weight or higher, and more preferably 10% by weight or higher, with respect to the weight of all the constitutional units included in the polymer (A). The upper limit of the content is preferably 50% by weight or lower, and more preferably 40% by weight or lower.

The content of the constitutional units included in the group (H) in the polymer (A) is preferably 50% by weight or higher, and more preferably 60% by weight or higher, with respect to the weight of all the constitutional units included in the polymer (A). The upper limit of the content is preferably 97% by weight or lower, and more preferably 90% by weight or lower.

The polymer (A) may include constitutional units derived from monomers copolymerizable with the α,β-unsaturated carboxylic acids and/or the derivatives thereof. The polymer (A) may include a single one of or a combination of two or more of constitutional units derived from monomers copolymerizable with the α,β-unsaturated carboxylic acids and/or the derivatives thereof.

Examples of the monomers copolymerizable with the α,β-unsaturated carboxylic acids and/or the derivatives thereof include, but are not limited to, styrene monomers (such as styrene and hydroxystyrene), vinyl esters (such as vinyl acetate and vinyl pivalate), and N-vinyl pyrrolidone, and N-vinyl pyrrolidone is preferred.

The glass transition temperature (Tg (° C.)) of the polymer (A), it is preferably −10° C. or higher and 60° C. or lower. The polymer (A) having a Tg of −10° C. or higher allows sufficient coating strength to be achieved when the modified polyolefin resin (C) is used for, for example, inks or paints, and also allows sufficient adhesion to a substrate to be achieved. Furthermore, blocking during printing can be substantially prevented when the modified polyolefin resin (C) is used in an ink. The polymer (A) having a Tg of 60° C. or lower can substantially prevent coating from being too hard, when the resin composition is used in, for example, an ink or a paint, and accordingly the coating can exhibit proper flexibility.

The glass transition temperature can be calculated using the following FOX equation using the glass transition temperatures (Tg) of homopolymers of monomers constituting the polymer (A) and the weight proportions of the monomers in the polymer (A). As the Tg of each of the homopolymers, Tg described in Polymer Handbook (Wiley-Interscience Publication, 4th Edition, 1999) and product data may be used.

$$1/Tg = W_1/Tg_1 + W_2/Tg_2 + W_3/Tg_3 + \ldots W_n/Tg_n \quad \text{<FOX equation>}$$

The above-mentioned equation is used when the polymer (A) comprises n types of monomers. $Tg_1$ refers to the glass transition temperature of a homopolymer of monomer 1 constituting the polymer (A), and $W_1$ refers to the weight fraction of the homopolymer of the monomer 1. $Tg_2$ refers to the glass transition temperature of a homopolymer of monomer 2 constituting the polymer (A), and $W_2$ refers to the weight fraction of the homopolymer of the monomer 2. $Tg_3$ refers to the glass transition temperature of a homopolymer of monomer 3 constituting the polymer (A), and $W_3$ refers to the weight fraction of the homopolymer of the monomer 3. $Tg_n$ refers to the glass transition temperature of a homopolymer of monomer n constituting the polymer (A), and $W_n$ refers to the weight fraction of the homopolymer of the monomer n. The glass transition temperature of the polymer (A) in each of examples is also calculated using the above-mentioned FOX equation.

1-2. Resin (B)

The resin (B) is a polyolefin resin or a modified product of a polyolefin resin.

<Polyolefin Resin>

The polyolefin resin as the resin (B) is an olefin polymer. The polyolefin resin as the resin (B) is preferably a polyolefin resin produced using a Ziegler Natta catalyst or a metallocene catalyst as a polymerization catalyst, and more preferably a polyolefin resin obtained by copolymerizing polypropylene or propylene and an α-olefin (such as ethylene, butene, 3-methyl-1-butene, or 3-methyl-1-heptene) by using a Ziegler Natta catalyst or a metallocene catalyst as a polymerization catalyst. Note that polypropylene and the polyolefin resin obtained by random-copolymerizing propylene and an α-olefin are sometimes referred to as a propylene random copolymer. Examples of the propylene random copolymer include polypropylene, an ethylene-propylene copolymer, a propylene-butene copolymer, an ethylene-propylene-diene copolymer, and an ethylene-propylene-butene copolymer. The polyolefin resin is still more preferably a propylene random copolymer produced using a metallocene catalyst as a polymerization catalyst, and particularly preferably polypropylene, an ethylene-propylene copolymer, a propylene-butene copolymer, or an ethylene-propylene-butene copolymer, each being produced using a metallocene catalyst as a polymerization catalyst. These resins may be used alone, or a mixture of two or more of the resins may be used.

As the above-mentioned metallocene catalyst, known ones may be used. Specific examples of the metallocene catalyst include a catalyst obtained by combining the following components (1) and (2), and furthermore, if needed, the following component (3). A catalyst obtained by combining the following components (1) and (2), furthermore, if needed, the following component (3) is preferred.

Component (1): a metallocene complex that is a compound of transition metals of Group IV to VI of the periodic table, having at least one conjugate five-membered ring ligand Component (2): an ion exchange laminar silicate Component (3): an organic aluminum compound The polyolefin resin synthesized using the metallocene catalyst has characteristics, such as narrow molecular weight distribution, excellence in random copolymerizability, narrow composition distribution, and copolymerizability with a wide range of comonomers, and is thus preferred as the resin (B).

The structure of the polyolefin resin as the resin (B) is not limited to a particular structure, and may be any of an isotactic structure, an atactic structure, a syndiotactic structure, and other structures, which normal polymer compounds can have, but, in view of adhesion to polyolefin substrates, especially adhesion under low-temperature and dry conditions, a polyolefin resin polymerized using the metallocene catalyst and having an isotactic structure is preferred.

The composition of the polyolefin resin as the resin (B) is not limited to a particular composition, but the polyolefin resin has a propylene component of preferably 60% by mol or higher, more preferably 70% by mol or higher, and still more preferably 80% by mol or higher. The use of the polyolefin resin having a propylene component of 60% by mol or higher as the resin (B) makes adhesion (adhesiveness) to propylene substrates better.

<Modified Product of Polyolefin Resin>

The resin (B) may be a modified product of a polyolefin resin. Preferred examples of the polyolefin resin in the modified product of the polyolefin resin are as already described in the <Polyolefin Resin> above.

The type of the modification is not particularly limited, and examples thereof include known modification, such as chlorination, epoxidation, hydroxylation, anhydrous carboxylation, and carboxylation. The modified product of the polyolefin resin can be obtained by modifying a polyolefin resin by using a well-known method. The modified product of the polyolefin resin as the resin (B) is preferably a chlorinated polyolefin resin. A method for chlorination of the polyolefin resin will be described later.

<Weight-Average Molecular Weight of Resin (B)>

The weight-average molecular weight of the resin (B) is preferably 10,000 or higher. The resin having a weight-average molecular weight of 10,000 or higher exhibits sufficient cohesion and is excellent in adhesion to substrates. The upper limit of the weight-average molecular weight of the resin (B) is preferably 200,000 or lower. The resin having a weight-average molecular weight of 200,000 or lower exhibits good compatibility with other resins contained in paints or inks, and is excellent in adhesion to substrates. Note that the weight-average molecular weight can determined from a standard polystyrene calibration curve by using gel permeation chromatography (GPC).

<Optional Component Included in Resin (B)>

The resin (B) may include a stabilizer. Examples of the stabilizer include an epoxy compound. The epoxy compound is not particularly limited, but is preferably an epoxy compound compatible with a modified resin such as a chlorinated resin. Examples of the epoxy compound include a compound having an epoxy equivalent in a range of approximately 100 to 500 and having at least one epoxy group in one molecule. Examples of such epoxy compound include epoxidated vegetable oils (such as epoxidated soybean oil and epoxidated linseed oil) obtained by epoxidating natural vegetable oils having an unsaturated group with peracids such as peracetic acid; epoxidated fatty acid esters obtained by epoxidating unsaturated fatty acids, such as oleic acid, tall oil fatty acid, and soybean oil fatty acid; epoxidated alicyclic compounds, such as epoxidated tetrahydrophthalate; ethers obtained by condensing bisphenol A or polyhydric alcohols and epichlorohydrin, such as bisphenol A glycidyl ether, ethylene glycol glycidyl ether, propylene glycol glycidyl ether, glycerol polyglycidyl ether, and sorbitol polyglycidyl ether; and monoepoxy compounds, such as butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, and phenolpolyethyleneoxide glycidyl ether. The stabilizers may be used alone, or two or more of them may be used in combination. The addition amount of the stabilizer, if added, is preferably 1% to 20% by weight (in terms of solid contents) with respect to the polyolefin resin or the modified product thereof.

1-3. Modified Polyolefin Resin

In the modified polyolefin resin of the present invention, the polymer (A) is grafted on the resin (B).

Examples of a method for obtaining the modified polyolefin resin (C) of the present invention include a method of introducing the polymer (A) into the resin (B) by graft copolymerization.

Examples of the method of introducing the polymer (A) into the resin (B) by graft-copolymerization include a method of graft-copolymerizing, to the resin (B), at least one selected from the group consisting of α,β-unsaturated carboxylic acids and derivatives of α,β-unsaturated carboxylic acids and, as necessary, monomers copolymerizable with the α,β-unsaturated carboxylic acids and/or the derivatives thereof.

Conditions for the graft-copolymerization are not limited to particular ones, and the graft-copolymerization may be conducted in accordance with a known method, such as a melting method or a solution method. The graft-copolymerization conducted in accordance with a melting method has the advantages of an easier operation and a shorter-time reaction. The graft-copolymerization conducted in accordance with a solution method causes less side reaction and achieves a uniform graft-polymer.

In the case of the graft copolymerization conducted in accordance with a melting method, the resin (B) is subjected to reaction by heat-melting in the presence of a radical reaction initiator. The temperature of the heat-melting is only required to be a melting point or higher, and is preferably a melting point or higher and 300° C. or lower. In the heat-melting, an apparatus, such as a Banbury mixer, a kneader, or an extruder, may be used.

In the case of the graft-copolymerization conducted in accordance with a solution method, the resin (B) is dissolved in an organic solvent, and subsequently, the resultant solution is subjected to reaction by heating and stirring in the presence of a radical reaction initiator. As the organic solvent, an aromatic solvent, such as toluene or xylene, is preferably used. The temperature for the reaction is preferably in a range of 100° C. to 180° C.

Examples of the radical reaction initiator used for the melting method and the solution method include, but are not particularly limited to, organic peroxide compounds and azonitriles. Examples of the organic peroxide compounds include di-tert-butylperoxide, dicumyl peroxide, tert-butylcumyl peroxide, benzoyl peroxide, dilauryl peroxide, 2,5-dimethyl-2,5-di(tert-butylperoxy)hexane, cumene hydroperoxide, tert-butyl hydroperoxide, 1,1-bis(tert-butylperoxy)-3,5,5-trimethylcyclohexane, 1,1-bis(tert-butylperoxy)-cyclohexane, cyclohexanone peroxide, tert-butylperoxy benzoate, tert-butylperoxy isobutyrate, tert-butylperoxy-3,5,5-trimethyl hexanoate, tert-butylperoxy-2-ethyl hexanoate, tert-butylperoxy isopropyl carbonate, and cumyl peroxyoctate. As the radical reaction initiator, a radical reaction initiator having an appropriate half-life temperature may be selected depending on a temperature at which radical polymerization is performed.

The content of the polymer (A) in the modified polyolefin resin (C) of the present invention is preferably 30% by weight or higher, more preferably 50% by weight or higher, and still more preferably 70% by weight or higher. The upper limit of the content of the polymer (A) is 90% by weight or lower.

The content of the polymer (A) in the modified polyolefin resin (C) means the weight proportion of a polymer (A) portion to the modified polyolefin resin (C).

The weight proportion (%) of the polymer (A) portion to the modified polyolefin resin (C) is usually in agreement with the blending ratio (%) of all monomers graft-polymerized with the resin (B) in the production of the modified polyolefin resin (C) (Note that the total of the blending weight of the resin (B) and the blending weight of all monomers graft-polymerized with the resin (B) is taken as 100%).

In the case where the modified polyolefin resin (C) of the present invention is a chlorinated resin, the content of the polymer (A) means the weight proportion (%) of the polymer (A) portion, except chlorine, to the modified polyolefin resin (C) as the chlorinated resin.

For example, in the case where the resin (B) is a chlorinated modified polyolefin resin, the weight proportion (the content) of the polymer (A) portion to the modified polyolefin resin (C) is usually in agreement with the blending ratio (%) of all monomers (all monomers constituting the polymer (A)) graft-polymerized with the resin (B) in the production of the modified polyolefin resin (C) (Note that the total of the blending weight of the resin (B) and the blending weight of all monomers graft-polymerized with the resin (B) is taken as 100%).

For example, in the case where the resin (B) is a polyolefin resin, the resin (B) is subjected to graft-polymerization to produce a grafted resin in which the polymer (A) is grafted on the resin (B), and the grafted resin is chlorinated to obtain the modified polyolefin resin (C) as a chlorinated resin, the weight proportion of the polymer (A) portion to the modified polyolefin resin (C) is usually in agreement with a value of the parts by weight of all monomers (all monomers constituting the polymer (A)) to be graft-polymerized with the resin (B), the monomers being used for producing 100 parts by weight of the modified polyolefin resin (C) as the chlorinated resin.

The modified polyolefin resin (C) of the present invention may be a chlorinated resin, and is preferably a chlorinated resin. In the case where the modified polyolefin resin (C) of the present invention is a chlorinated resin, the modified polyolefin resin (C) is only required to be obtained by chlorination in any stage in the production thereof. For example, the modified polyolefin resin (C) may be obtained by chlorinating a polyolefin resin or may be obtained by grafting the polymer (A) on a polyolefin resin and then chlorinating the resultant resin.

Hence, examples of a method for obtaining the chlorinated resin include a method in which chlorination is performed after grafting the polymer (A) on the resin (B), and a method in which a polyolefin resin is chlorinated to obtain a chlorinated polyolefin resin as the resin (B) and then the polymer (A) is grafted on the resin (B).

As a method for the chlorination, well-known methods can be made use of. Examples of the chlorination method include, but are not particularly limited to, a method in which a resin is dissolved in a chlorine solvent, such as chloroform, and then chlorine gas is blown thereinto to introduce chlorine. More specifically, the chlorination can be carried out in such a manner that a resin is dispersed or dissolved in a medium, such as water, carbon tetrachloride, or chloroform, and chlorine gas is blown thereinto in the presence of a catalyst or under ultraviolet irradiation at a temperature in a range of 50° C. to 140° C. under pressure or without pressure.

In the case where a chlorine solvent is used in the production of the chlorinated resin, the used chlorine solvent usually can be distilled off under reduced pressure, for example, or can be substituted by another organic solvent.

In the case where a polyolefin resin is chlorinated to obtain a chlorinated polyolefin resin as the resin (B), the chlorine content of the chlorinated polyolefin resin as the resin (B) is preferably 10% by weight or higher, and more preferably 15% by weight or higher. When the chlorine content is 10% by weight or higher, the resin has excellent dispersibility in alcohols, such as ethanol and isopropanol. The upper limit of the chlorine content of the chlorinated polyolefin resin as the resin (B) is preferably 50% by weight or lower, and more preferably 45% by weight or lower.

When the chlorine content is 50% by weight or lower, the resin has excellent adhesion to polyolefin substrates.

Note that the chlorine content of the resin can be measured in accordance with JIS-K7229.

In the case where the modified polyolefin resin is a chlorinated resin, the chlorine content of the modified polyolefin resin is preferably 10% by weight or higher, and more preferably 15% by weight or higher. The upper limit of the chlorine content of the modified polyolefin resin is preferably 50% by weight or lower, and more preferably 45% by weight or lower. It is expected that, when the chlorine content of the modified polyolefin resin is in the above-mentioned range, the modified polyolefin resin (C) has a higher polarity, and the modified polyolefin resin more easily exhibits a linear structure owing to steric repulsion between chlorine atoms. Therefore, it is expected that the resin has excellent dispersibility in alcohols serving as a high polar solvent.

2. Modified Polyolefin Resin Composition Including Modified Polyolefin Resin

The modified polyolefin resin of the present invention may constitute a modified polyolefin resin composition together with other optional components. For example, the modified polyolefin resin composition may be in the form of a resin dispersion including the modified polyolefin resin and a dispersing medium. Note that, in this specification, the "dispersing medium" includes a solvent capable of dissolving the modified polyolefin resin.

<Resin Dispersion>

The dispersing medium preferably includes alcohols (for example, aliphatic alcohols, such as methanol, ethanol, n-propyl alcohol, isopropyl alcohol, n-butyl alcohol, isobutyl alcohol, sec-butyl alcohol, tert-butyl alcohol, and 2-ethyl-hexanol; and glycol monoethers, such as propylene glycol monomethyl ether, propylene glycol monoethyl ether, propylene glycol monopropyl ether, propylene glycol monoisopropyl ether, and propylene glycol monobutyl ether), more preferably includes lower alcohols, still more preferably $C_{1-4}$ alcohols (for example, methanol, ethanol, n-propyl alcohol, isopropyl alcohol, n-butyl alcohol, and isobutyl alcohol), and particularly preferably includes at least one selected from methanol, ethanol, n-propyl alcohol, isopropyl alcohol, n-butyl alcohol, and isobutyl alcohol.

The content of alcohols in the dispersing medium is preferably 50% by weight or higher and 100% by weight or lower. Thus, a resin dispersion in which a modified polyolefin resin is sufficiently dispersed in the dispersing medium can be obtained.

The resin dispersion may include a medium except alcohols, as the dispersing medium. Examples of the dispersing medium except alcohols include solvents usually used for inks and/or paints, and examples of the solvents include aromatic solvents, such as toluene and xylene; alicyclic hydrocarbon solvents, such as cyclohexane and methyl cyclohexane; hydrocarbon solvents, such as hexane, heptane, and octane; ketone solvents, such as acetone, methyl ethyl ketone, and methyl isobutyl ketone; ester solvents, such as methyl acetate, ethyl acetate, n-propyl acetate, isopropyl acetate, and n-butyl acetate; glycol solvents, such as ethylene glycol, ethyl cellosolve, and butyl cellosolve; and water. Among these solvents, at least one selected from ester solvents and water is preferred, and at least one selected from ethyl acetate, propyl acetate, butyl acetate, and water are more preferred. The amount of the dispersing medium except alcohols is preferably 0% by weight or higher and 50% by weight or lower with respect to the total weight of the dispersing medium.

Even when modified by, for example, chlorination, the modified polyolefin resin (C) of the present invention is excellent in dispersibility in (or solubility in and/or compatibility with) the dispersing medium including alcohols, and therefore, by dispersing the modified polyolefin resin (C) in the dispersing medium including alcohols, a resin dispersion in which a modified polyolefin resin is stably dispersed can be formed.

The weight ratio of the modified polyolefin resin (C) to the dispersing medium in the resin dispersion is preferably the resin (C)/the dispersing medium=5/95 to 70/30, and more preferably the resin (C)/the dispersing medium=15/85 to 50/50.

When the weight ratio of the resin (C)/the dispersing medium is 70/30 or lower, the resin has less cohesion, and accordingly is in a good dispersion state. When the weight ratio is 5/95 or higher, the amount of adhesion components is appropriate, and accordingly, sufficient adhesion is achieved.

The resin dispersion including the modified polyolefin resin (C) of the present invention or a modified polyolefin resin is useful as a component of a composition for inks, a composition for paints, or a composition for adhesives, and is preferably useful as a component of an ink composition for gravure printing or an ink composition for flexographic printing.

Besides the modified polyolefin resin or the resin dispersion, the composition for inks, the composition for paints, and the composition for adhesives may include a component usually contained in inks, a component usually contained in paints, and a component usually contained in adhesives, respectively, as needed.

Using the ink composition for gravure printing or the ink composition for flexographic printing, printing on various objects for printing can be performed by various printing methods. Examples of the objects for printing include resin films, such as a polyolefin film, a polyester film, and a nylon film, and paper. The gravure printing and the flexographic printing may be performed in accordance with usual methods.

EXAMPLES

Hereinafter, the present invention will be described in detail with reference to examples, but the present invention is not limited to these examples. Note that the term "part(s)" means "part(s) by weight" unless otherwise noted.

<Production Example 1> Polyolefin Resin

A propylene random copolymer (propylene unit content: 96% by weight, ethylene unit content: 4% by weight) produced using a metallocene catalyst as a polymerization catalyst was fed into a twin-screw extruder with a barrel temperature set at 350° C. and was subjected to thermal degradation to obtain a polyolefin resin, namely, a polypropylene resin (B1) having a melt viscosity at 160° C. of approximately 4,000 mPa·s and a molecular weight of 10,000.

<Production Example 2> Chlorinated Polyolefin Resin

Into a glass-lined reaction vessel, 100 parts by weight of the polypropylene resin (B1) obtained in Production Example 1 was fed. To the resin in the reaction vessel, chloroform was added, and chlorine gas and oxygen gas were blown thereinto under a pressure of 2 kg/cm$^2$ and ultraviolet irradiation to perform chlorination until the chlorine content of the resin reached 32 wt %. After the completion of the chlorination reaction, 6 parts by weight of an epoxy compound (Epocizer W-100EL, manufactured by DIC Corporation) was added as a stabilizer, and the resultant mixture was fed into an extruder with a vent that was equipped with a suction unit for solvent-removal in a screw shaft section, and the mixture was subjected to solvent-removal and solidified to obtain a chlorinated polyolefin resin, namely, a chlorinated polypropylene resin (B2) having a weight-average molecular weight of 11,000.

<Production Example 3> Polyolefin Resin

A propylene random copolymer (propylene unit content: 85% by weight, ethylene unit content: 15% by weight) produced using a metallocene catalyst as a polymerization catalyst was fed into a twin-screw extruder with a barrel temperature set at 320° C. and was subjected to thermal degradation to obtain a polyolefin resin, namely, a polypropylene resin (B3) having a melt viscosity at 160° C. of approximately 3,200 mPa·s and a molecular weight of 35,000.

<Production Example 4> Chlorinated Polyolefin Resin

Into a glass-lined reaction vessel, 100 parts by weight of the polypropylene resin (B3) obtained in Production Example 3 was fed. To the resin in the reaction vessel, chloroform was added, and chlorine gas and oxygen gas were blown thereinto under a pressure of 2 kg/cm$^2$ and ultraviolet irradiation to perform chlorination until the chlorine content of the resin reached 40 wt %. After the completion of the chlorination reaction, 6 parts by weight of an epoxy compound (Epocizer W-100EL, manufactured by DIC Corporation) was added as a stabilizer, and the resultant mixture was fed into an extruder with a vent that was equipped with a suction unit for solvent-removal in a screw shaft section, and the mixture was subjected to solvent-removal and solidified to obtain a chlorinated polyolefin resin, namely, a chlorinated polypropylene resin (B4) having a weight-average molecular weight of 36,000.

<Production Example 5> Polyolefin Resin

A propylene random copolymer (propylene unit content: 96% by weight, butene unit content: 4% by weight) produced using a metallocene catalyst as a polymerization catalyst was fed into a twin-screw extruder with a barrel temperature set at 360° C. and was subjected to thermal degradation to obtain a polyolefin resin, namely, a polypropylene resin (B5) having a melt viscosity at 160° C. of approximately 4,200 mPa·s and a molecular weight of 71,000.

<Production Example 6> Chlorinated Polyolefin Resin

Into a glass-lined reaction vessel, 100 parts by weight of the polypropylene resin (B5) obtained in Production Example 5 was fed. To the resin in the reaction vessel, chloroform was added, and chlorine gas and oxygen gas were blown thereinto under a pressure of 2 kg/cm$^2$ and ultraviolet irradiation to perform chlorination until the chlorine content of the resin reached 26 wt %. After the completion of the chlorination reaction, 6 parts by weight of an epoxy compound (Epocizer W-100EL, manufactured by DIC Corporation) was added as a stabilizer, and the resultant mixture was fed into an extruder with a vent that was equipped with a suction unit for solvent-removal in a screw shaft section, and the mixture was subjected to solvent-removal and solidified to obtain a chlorinated polyolefin resin, namely, a chlorinated polypropylene resin (B6) having a weight-average molecular weight of 74,000.

Example 1

100 parts by weight of the polypropylene resin (B1) was dissolved in 880 parts by weight of propyl acetate, and, to the resultant solution, 5 parts by weight of an epoxy compound (Epocizer W-131, manufactured by DIC Corporation) was added. To the resultant mixture, 5.5 parts by weight of a peroxy ester peroxide (PERBUTYL O, manufactured by NOF CORPORATION) was added in an atmosphere of nitrogen at 85° C., and subsequently the polymer (A) having formulation listed in Table 1 (16 parts by weight of methacrylic acid, 20 parts by weight of methyl methacrylate, 64 parts by weight of cyclohexyl methacrylate, 100 parts by weight of n-butyl methacrylate, 140 parts by weight of 2-methoxyethyl acrylate, and 60 parts by weight of 2-hydroxyethyl acrylate) was added thereto, and the resultant mixture was subjected to reaction at 85° C. for 6 hours or longer, and then cooled to obtain a solution of a modified polyolefin resin, namely, a modified polypropylene resin (C1) listed in Table 2 and having a weight-average molecular weight of 14,000.

From 100 parts by weight of the obtained solution containing the modified polypropylene resin (C1), the solvent was distilled off to achieve a solid content of 60 wt %. To the resultant, 200 parts by weight of ethanol was added under stirring at 70° C., and subsequently the resultant mixture was cooled to obtain a resin dispersion (1) containing the modified polypropylene resin (C1). The ethanol content of a dispersing medium not including the resin dispersion (1) solid was 75% by weight. The weight ratio (the resin (C1)/the dispersing medium) of the modified polypropylene resin (C1) to the dispersing medium was 30% by weight.

Example 2

Into a glass-lined reaction vessel, 100 parts by weight of the modified polypropylene resin (C1) solid obtained in Example 1 was fed. To the resin solid in the reaction vessel, chloroform was added, and chlorine gas and oxygen gas were blown thereinto under a pressure of 2 kg/cm$^2$ and ultraviolet irradiation to perform chlorination until the chlorine content of the polypropylene resin (B1) reached 32 wt %. After the completion of the chlorination reaction, 6 parts by weight of an epoxy compound (Epocizer W-100EL, manufactured by DIC Corporation) was added as a stabilizer, and the resultant mixture was fed into an extruder with a vent that was equipped with a suction unit for solvent-removal in a screw shaft section, and the mixture was subjected to solvent-removal and solidified to obtain a solid of a modified polyolefin resin, namely, a modified polypropylene resin (C2) listed in Table 2 and having a weight-average molecular weight of 18,000. The total of monomers constituting the polymer (A) that was used for producing 100 parts by weight of the resin (C2) was 73.1 parts by weight.

60 parts by weight of the obtained solid was added to 200 parts by weight of ethanol at 70° C. and dissolved under stirring, and then the resultant solution was cooled to obtain a resin dispersion (2) containing the modified polypropylene resin (C2).

Example 3

A solution of a modified polyolefin resin, namely, a modified polypropylene resin (C3) listed in Table 2 and having a weight-average molecular weight of 23,000 and a resin dispersion (3) containing the modified polypropylene resin (C3) were obtained in the same manner as in Example 1, except that the chlorinated polypropylene resin (B2) was used in place of the polypropylene resin (B1).

Example 4

A solution of a modified polyolefin resin, namely, a modified polypropylene resin (C4) listed in Table 2 and a resin dispersion (4) containing the modified polypropylene resin (C4) were obtained in the same manner as in Example 1, except that the polypropylene resin (B3) was used in place of the polypropylene resin (B1), and the formulation of the polymer (A) was changed to another formulation listed in Table 1.

Example 5

A modified polyolefin resin, namely, a modified polypropylene resin (C5) listed in Table 2 and a resin dispersion (5) containing the modified polypropylene resin (C5) were obtained in the same manner as in Example 2, except that the modified polypropylene resin (C4) was used in place of the modifier polypropylene resin (C1).

Example 6

A solution of a modified polyolefin resin, namely, a modified polypropylene resin (C6) listed in Table 2 and a resin dispersion (6) containing the modified polypropylene resin (C6) were obtained in the same manner as in Example 1, except that the chlorinated polypropylene resin (B4) was used in place of the polypropylene resin (B1) and the formulation of the polymer (A) was changed to another formulation listed in Table 1.

Example 7

A solution of a modified polyolefin resin, namely, a modified polypropylene resin (C7) listed in Table 2 and a resin dispersion (7) containing the modified polypropylene resin (C7) were obtained in the same manner as in Example 1, except that the polypropylene resin (B5) was used in place of the polypropylene resin (B1) and the formulation of the polymer (A) was changed to another formulation listed in Table 1.

Example 8

A modified polyolefin resin, namely, a modified polypropylene resin (C7') was obtained in the same manner as in Example 1, except that the polypropylene resin (B5) was used in place of the polypropylene resin (B1), and the formulation of the polymer (A) and the weight ratio (B/A) were changed to another formulation and another weight ratio each listed in Table 1.

A modified polyolefin resin, namely, a modified polypropylene resin (C8) listed in Table 2 and a resin dispersion (8) containing the modified polypropylene resin (C8) were obtained in the same manner as in Example 2, except that the modified polypropylene resin (C7') was used in place of the modified polypropylene resin (C1).

The total of monomers constituting the polymer (A) that was used for producing 100 parts by weight of the resin (C8) was 67.1 parts by weight.

Example 9

A solution of a modified polyolefin resin, namely, a modified polypropylene resin (C9) listed in Table 2 and a resin dispersion (9) containing the modified polypropylene resin (C9) were obtained in the same manner as in Example 1, except that the chlorinated polypropylene resin (B6) was used in place of the polypropylene resin (B1) and the formulation of the polymer (A) was changed to another formulation listed in Table 1.

Example 10

A solution of a modified polyolefin resin, namely, a modified polypropylene resin (C10) listed in Table 2 and a resin dispersion (10) containing the modified polypropylene resin (C10) were obtained in the same manner as in Example 1, except that the chlorinated polypropylene resin (B6) was used in place of the polypropylene resin (B1), and the formulation of the polymer (A) and the weight ratio (B/A) were changed to another formulation and another weight ratio each listed in Table 1.

Example 11

A solution of a modified polyolefin resin, namely, a modified polypropylene resin (C11) listed in Table 2 and a resin dispersion (11) containing the modified polypropylene resin (C11) were obtained in the same manner as in Example 1, except that the chlorinated polypropylene resin (B6) was used in place of the polypropylene resin (B1), and the formulation of the polymer (A) and the weight ratio (B/A) were changed to another formulation and another weight ratio each listed in Table 1.

Comparative Example 1

A solution of a modified polyolefin resin, namely, a modified polypropylene resin (C12) listed in Table 2 and a resin dispersion (12) containing the modified polypropylene resin (C12) were obtained in the same manner as in Example 3, except that the formulation of the polymer (A) was changed to another formulation listed in Table 1.

Comparative Example 2

A solution of a modified polyolefin resin, namely, a modified polypropylene resin (C13) listed in Table 2 and a resin dispersion (13) containing the modified polypropylene resin (C13) were obtained in the same manner as in Example 6, except that the formulation of the polymer (A) was changed to another formulation listed in Table 1.

Comparative Example 3

A solution of a modified polyolefin resin, namely, a modified polypropylene resin (C14) listed in Table 2 and a resin dispersion (14) containing the modified polypropylene resin (C14) were obtained in the same manner as in Example 1, except that the chlorinated polypropylene resin (B6) was used in place of the polypropylene resin (B1), and the formulation of the polymer (A) and the weight ratio (B/A) were changed to another formulation and another weight ratio each listed in Table 1.

<Evaluation>

The modified polypropylene resins and the resin dispersions obtained in Examples and Comparative Examples were evaluated using the following methods. Table 2 shows evaluation results.

<Weight-Average Molecular Weight (Mw)>

Using GPC manufactured by Tosoh Corporation, weight-average molecular weight was measured under the following conditions.

Column: TSK-gel G-6000 H×L, G-5000 H×L, G-4000 H×L, G-3000 H×L, and G-2000 H×L (manufactured by Tosoh Corporation)

Eluent: THF

Flow rate: 1.0 mL/min

Temperatures of pump oven and column oven: 40° C.

Feeding amount: 100 µL

Molecular-weight standard substance: polystyrene ("Easical PS-1", supplied by Agilent Technology)

<Glass Transition Temperature (Tg)>

Using a value of the glass transition temperature (Tg) of a homopolymer of each of unsaturated carboxylic acid monomers and unsaturated carboxylic acid ester monomers described in Polymer Handbook and product data, a glass transition temperature (Tg) was calculated from the weight proportions of each of the unsaturated carboxylic acid monomers and each of the unsaturated carboxylic acid ester monomers by using the above-mentioned FOX equation.

<Hydroxyl Value (mgKOH/g) of Polymer (A)>

According to the above-mentioned method, the hydroxyl value of the polymer (A) was calculated from known hydroxyl values of $\alpha,\beta$-unsaturated carboxylic acids and $\alpha,\beta$-unsaturated carboxylic acid esters and the weight proportions of each of the $\alpha,\beta$-unsaturated carboxylic acids and each of the $\alpha,\beta$-unsaturated carboxylic acid esters in the polymer (A).

<Measurement of Chlorine Content>

A chlorine content was measured in accordance with JIS-K7229.

<Stability of Resin Dispersion>

Into a 250-ml glass container, 150 g of a resin dispersion was put, and left standing at room temperature for 1 week, and then, the stability of the resin dispersion was visually evaluated.

Excellent: No change in color, no precipitate, and excellent stability were observed.

Good: A minor change in color was observed, but did not matter in practical application.

Poor: A change in color or the generation of a precipitate were observed, which led to poorer preservability.

<Ink Adhesion Test>

[Preparation of Coating Test Piece]

32 parts by weight of a urethane resin for printing inks (SANPRENE IB-974, manufactured by Hitachi Chemical Co., Ltd., 40 wt %), 30 parts by weight of titanium dioxide (rutile type, manufactured by ISHIHARA SANGYO KAI-SHA, LTD.), 25 parts by weight of ethyl acetate, and 13 parts by weight of isopropyl alcohol were kneaded using a sand mill for 1 hour to prepare an ink. To 100 parts by weight of the ink, 10 parts by weight of the resin dispersion obtained in each of Examples and Comparative Examples was added, and the mixture was sufficiently stirred to obtain an ink composition.

Subsequently, a coating of the ink composition was formed with a bar-coating process on a corona treated surface of an OPP film (biaxially-stretched polypropylene film) (trade name: FOS, 60-µm product, manufactured by Futamura Chemical Co., Ltd.) by using a Coating Rod #5, and then the coating was hot-air-dried using a dryer to obtain a coating test piece.

[Adhesiveness Test]

Immediately after the coating process (0 to 1 hour after the coating process) and half a day after the coating process (10 to 12 hours after the coating process), a cellophane tape (manufactured by Nichiban Co., Ltd., 24 mm in width) was brought into intimate contact with the coating of the obtained coating test piece, and then peeled off from the intimate contact surface in the 180° direction, and the state of the coating in a test portion was visually observed.

Excellent: No peeling was observed in the coating.

Good: The coating was partially lifted or peeled off, but there was practically no problem.

Poor: The coating was lifted or peeled off, and hence was not suitable for practical use.

TABLE 1

| | Parts by weight of each of monomers used for synthesis of polymer (A) (with respect to 100 parts by weight of resin (B)) | | | | | | Resin (B) | | Weight ratio (B/A) |
|---|---|---|---|---|---|---|---|---|---|
| | MAA | MMA | CHMA | BMA | 2-MTA | HEA | Type | Constitutional unit ratio | Molecular weight |
| Example 1 | 16 | 20 | 64 | 100 | 140 | 60 | B1 | P/E = 96/4 | 10,000 | 20/80 |
| Example 2 | 16 | 20 | 64 | 100 | 140 | 60 | B1 | P/E = 96/4 | 10,000 | 20/80 |
| Example 3 | 16 | 20 | 64 | 100 | 140 | 60 | B2 | P/E = 96/4 | 11,000 | 20/80 |
| Example 4 | 32 | 60 | 100 | 80 | 96 | 32 | B3 | P/E = 85/15 | 35,000 | 20/80 |
| Example 5 | 32 | 60 | 100 | 80 | 96 | 32 | B3 | P/E = 85/15 | 35,000 | 20/80 |
| Example 6 | 32 | 60 | 100 | 80 | 96 | 32 | B4 | P/E = 85/15 | 36,000 | 20/80 |
| Example 7 | 28 | 128 | 104 | 60 | 40 | 40 | B5 | P/B = 96/4 | 71,000 | 20/80 |
| Example 8 | 21 | 96 | 78 | 45 | 30 | 30 | B5 | P/B = 96/4 | 71,000 | 25/75 |
| Example 9 | 28 | 128 | 104 | 60 | 40 | 40 | B6 | P/B = 96/4 | 74,000 | 20/80 |
| Example 10 | 2 | 3 | 9 | 13 | 19 | 8 | B6 | P/B = 96/4 | 74,000 | 65/35 |
| Example 11 | 5 | 3 | 9 | 11 | 5 | 22 | B6 | P/B = 96/4 | 74,000 | 65/35 |
| Comparative Example 1 | 20 | 40 | 80 | 120 | 136 | 4 | B2 | P/E = 96/4 | 11,000 | 20/80 |

TABLE 1-continued

| | Parts by weight of each of monomers used for synthesis of polymer (A) (with respect to 100 parts by weight of resin (B)) | | | | | | Resin (B) | | Weight ratio |
|---|---|---|---|---|---|---|---|---|---|
| | MAA | MMA | CHMA | BMA | 2-MTA | HEA | Type | Constitutional unit ratio | Molecular weight | (B/A) |
| Comparative Example 2 | 40 | 20 | 92 | 128 | 120 | 0 | B4 | P/E = 85/15 | 36,000 | 20/80 |
| Comparative Example 3 | 1 | 1 | 6 | 6 | 11 | 29 | B6 | P/B = 96/4 | 74,000 | 65/35 |

[Footnote for Table 1]
P: propylene,
E: ethylene,
B: butene
MAA: methacrylic acid
MMA: methyl methacrylate
CHMA: cyclohexyl methacrylate
BMA: n-butyl methacrylate
2-MTA: 2-methoxy ethyl acrylate
HEA: 2-hydroxy ethyl acrylate

TABLE 2

| | Resin (C) | Weight-average molecular weight of (C) | Hydroxy value of (A) (mgKOH/g) | Tg of (A) (° C.) | Stability of resin dispersion | Ink adhesion test | |
|---|---|---|---|---|---|---|---|
| | | | | | | Immediately after coating process | Half a day after coating process |
| Example 1 | C1 | 14,000 | 72.5 | −0.2 | Excellent | Excellent | Excellent |
| Example 2 | C2 | 18,000 | 72.5 | −0.2 | Excellent | Excellent | Excellent |
| Example 3 | C3 | 23,000 | 72.5 | −0.2 | Excellent | Excellent | Excellent |
| Example 4 | C4 | 70,000 | 38.7 | 27.5 | Excellent | Good | Good |
| Example 5 | C5 | 72,000 | 38.7 | 27.5 | Excellent | Excellent | Excellent |
| Example 6 | C6 | 90,000 | 38.7 | 27.5 | Excellent | Excellent | Excellent |
| Example 7 | C7 | 120,000 | 48.3 | 53.3 | Excellent | Good | Good |
| Example 8 | C8 | 135,000 | 48.3 | 53.3 | Excellent | Excellent | Excellent |
| Example 9 | C9 | 142,000 | 48.3 | 53.3 | Excellent | Excellent | Excellent |
| Example 10 | C10 | 132,000 | 72.5 | −0.2 | Excellent | Excellent | Excellent |
| Example 11 | C11 | 128,000 | 193.3 | 19.5 | Excellent | Excellent | Excellent |
| Comparative Example 1 | C12 | 25,000 | 4.8 | 11.6 | Good | Good | Poor |
| Comparative Example 2 | C13 | 50,000 | 0.0 | 19.8 | Good | Good | Poor |
| Comparative Example 3 | C14 | 144,000 | 256.1 | −7.2 | Good | Poor | Poor |

Table 2 reveals that, compared with the resin dispersions of Comparative Examples 1 and 2 in which the respective polymers (A) have a hydroxyl value of 10 mgKOH/g or smaller and the resin dispersion of Comparative Example 3 in which the polymer (A) has a hydroxyl value larger than 200 mgKOH/g, the resin dispersions of Examples 1 to 11 in which the respective polymers (A) have a hydroxyl value in range of 10 mgKOH/g or larger and 200 mgKOH/g or smaller are more excellent in stability and have better adhesion to polypropylene as a nonpolar substrate.

The invention claimed is:

1. A resin dispersion, comprising:
a dispersing medium comprising 50% by weight or higher of alcohols; and
a modified polyolefin resin, comprising:
a polymer (A), which is a polymer comprising constitutional unit selected from the group consisting of a constitutional unit derived from an α,β-unsaturated carboxylic acid and a constitutional unit derived from a derivative of an α,α-unsaturated carboxylic acid, and having a hydroxyl value in a range of 10 mgKOH/g or larger and 200 mgKOH/g or smaller, and
a resin (B), which is a polyolefin resin or a modified product thereof,
wherein the polymer (A) is grafted on the resin (B).

2. The resin dispersion according to claim 1, wherein the modified polyolefin resin is a chlorinated resin.

3. The resin dispersion according to claim 2, wherein the resin (B) is a chlorinated polyolefin resin.

4. The resin dispersion according to claim 1, wherein the polymer (A) has a glass transition temperature (Tg) in a range of −10° C. or higher and 60° C. or lower.

5. The resin dispersion according to claim 1, wherein the polymer (A) comprises a constitutional unit derived from an α,β-unsaturated carboxylic acid ester.

6. The resin dispersion according to claim 1, wherein a content of the polymer (A) is in a range of 30% by weight or higher and 90% by weight or lower.

7. The resin dispersion according to claim 1, wherein the modified polyolefin resin has a weight-average molecular weight in a range of 10,000 or higher and 200,000 or lower.

8. A composition for adhesives, comprising:
the resin dispersion according to claim 1.

9. A composition for paints, comprising the resin dispersion according to claim 1.

10. An ink composition for gravure printing, comprising the resin dispersion according to claim 1.

11. An ink composition for flexographic printing, comprising the resin dispersion according to claim 1.

12. A gravure printed matter, comprising: the ink composition for gravure printing according to claim 10.

13. A flexographic printed matter, comprising: the ink composition for flexographic printing according to claim 11.

14. A method for gravure printing, comprising: printing the ink composition for gravure printing according to claim 10 on an object.

15. A method for flexographic printing, comprising:
printing the ink composition for flexographic printing according to claim 11 on an object.

\* \* \* \* \*